(12) United States Patent
Roberts

(10) Patent No.: US 10,791,674 B2
(45) Date of Patent: Oct. 6, 2020

(54) MOWER SPRAYER ATTACHMENT APPARATUS

(71) Applicant: Dale Roberts, Gardners, PA (US)

(72) Inventor: Dale Roberts, Gardners, PA (US)

(*) Notice: Subject to any disclaimer, the term of this patent is extended or adjusted under 35 U.S.C. 154(b) by 119 days.

(21) Appl. No.: 16/155,218

(22) Filed: Oct. 9, 2018

(65) Prior Publication Data

US 2020/0107500 A1 Apr. 9, 2020

(51) Int. Cl.
*A01D 43/14* (2006.01)
*B05B 15/60* (2018.01)
*A01D 101/00* (2006.01)

(52) U.S. Cl.
CPC .............. *A01D 43/14* (2013.01); *B05B 15/60* (2018.02); *A01D 2101/00* (2013.01)

(58) Field of Classification Search
CPC ..... A01D 43/14; A01D 2101/00; B05B 15/60
USPC ............... 239/159, 163, 172, 175, 662, 663; 56/16.4 R, 16.8, 16.9
See application file for complete search history.

(56) References Cited

U.S. PATENT DOCUMENTS

| | | | |
|---|---|---|---|
| 4,602,742 A * | 7/1986 | Penson | A01M 7/006 239/172 |
| 4,821,959 A | 4/1989 | Browning | |
| 5,106,020 A | 4/1992 | Harrell | |
| 5,190,218 A * | 3/1993 | Kayser | A01M 7/0042 239/172 |
| 5,195,308 A | 3/1993 | Grote | |
| 5,533,676 A | 7/1996 | Conley | |
| 5,657,620 A * | 8/1997 | Thagard | A01D 34/64 56/16.4 R |
| 6,138,770 A * | 10/2000 | Kayser | A01B 59/06 239/172 |
| 6,374,586 B1 | 4/2002 | Burch | |
| 6,808,126 B1 | 10/2004 | Dunlap | |
| D748,676 S | 2/2016 | Higashikawa | |

* cited by examiner

*Primary Examiner* — Steven J Ganey

(57) ABSTRACT

A mower sprayer attachment apparatus for simultaneous mowing and spraying includes a tank mount comprising a plurality of support arms configured to couple to a deck of a mower and a platform coupled to the plurality of support arms. A storage tank is coupled to the tank mount. A pump is coupled to the deck of the mower and has an intake port, a discharge port, and a drive wheel. The intake port is linked to the storage tank by an intake hose. The drive wheel powers the pump to draw a liquid, pressurize said liquid and expel it through the discharge port. A belt is coupled to the drive wheel and is configured to couple to a drive shaft of the mower to rotate the drive wheel. A spray apparatus is coupled to the discharge port and releases the liquid on each side of the mower.

11 Claims, 5 Drawing Sheets

MOWER SPRAYER ATTACHMENT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to sprayer attachment apparatuses and more particularly pertains to a new sprayer attachment apparatus for simultaneous mowing and spraying.

BRIEF SUMMARY OF THE INVENTION

An embodiment of the disclosure meets the needs presented above by generally comprising a tank mount comprising a plurality of support arms and a platform. The plurality of support arms is configured to couple to a deck of a mower and the platform is coupled to the plurality of support arms. A storage tank is coupled to the tank mount and has a fill aperture and a release aperture. A fill cap is coupled to the storage tank to cover and alternatively uncover the fill aperture. An intake hose is coupled to the release aperture. A pump is coupled to the deck of the mower and has an intake port, a discharge port, and a drive wheel. The intake port is coupled to the intake hose. The drive wheel powers the pump to draw a liquid from the storage tank through the intake hose and intake port, pressurize said liquid and expelling it through the discharge port. A belt is coupled to the drive wheel and is configured to couple to a drive shaft of the mower, thus rotating the drive wheel. A spray apparatus is coupled to the discharge port and releases the liquid on each side of the mower.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
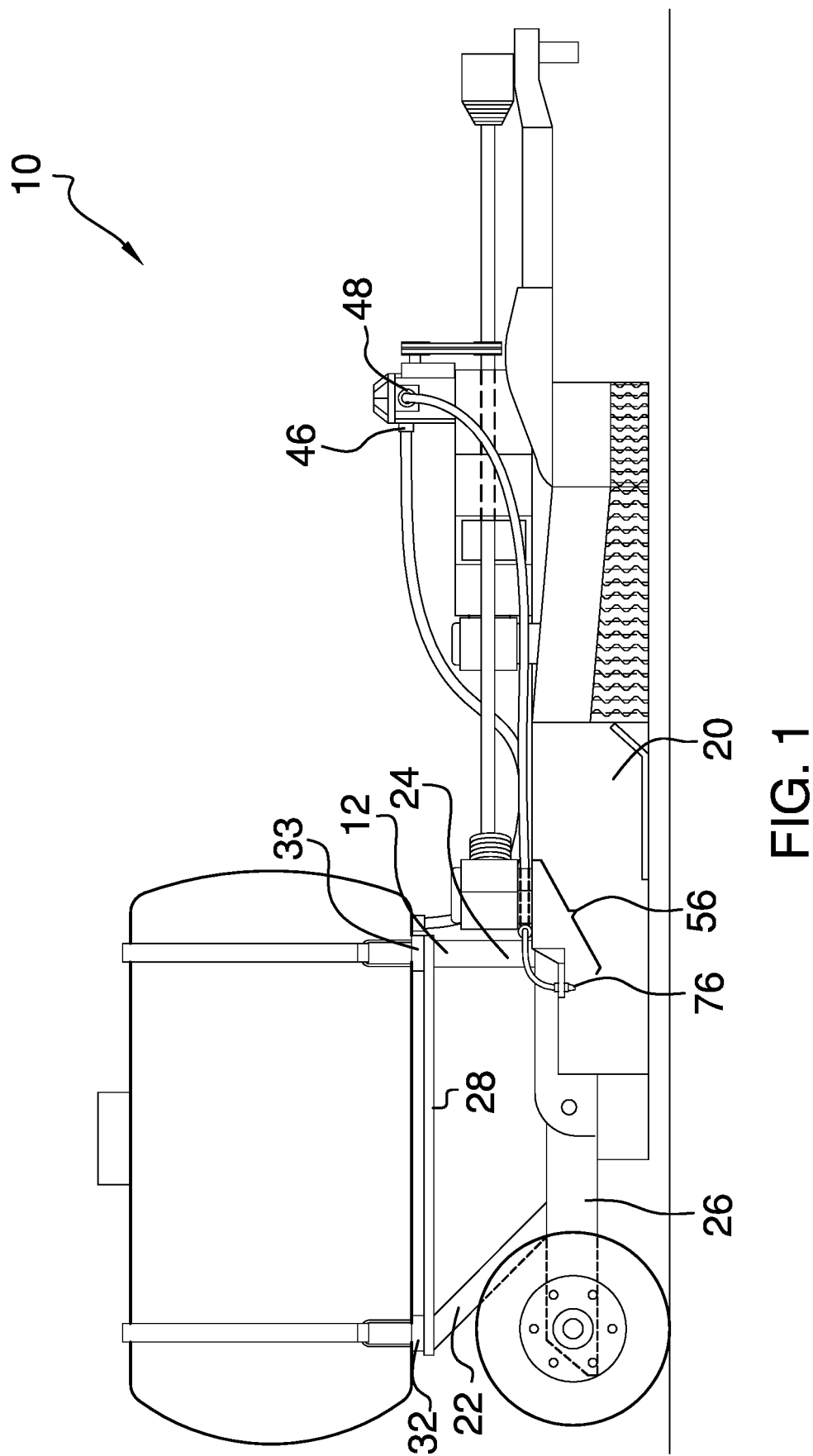
FIG. 1 is a side elevation view of a mower sprayer attachment apparatus according to an embodiment of the disclosure.
Figure 2:
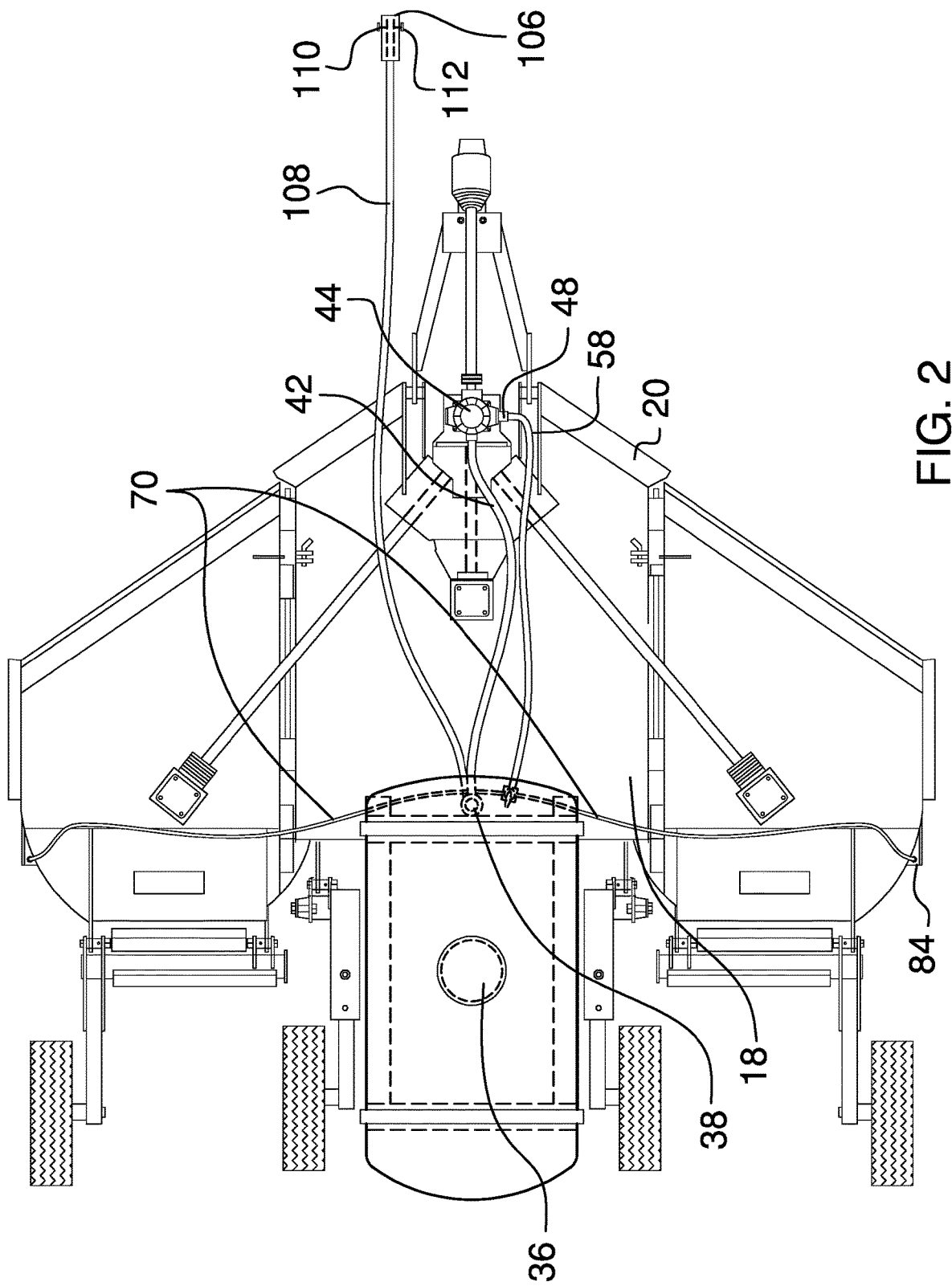
FIG. 2 is a top plan view of an embodiment of the disclosure.
Figure 3:
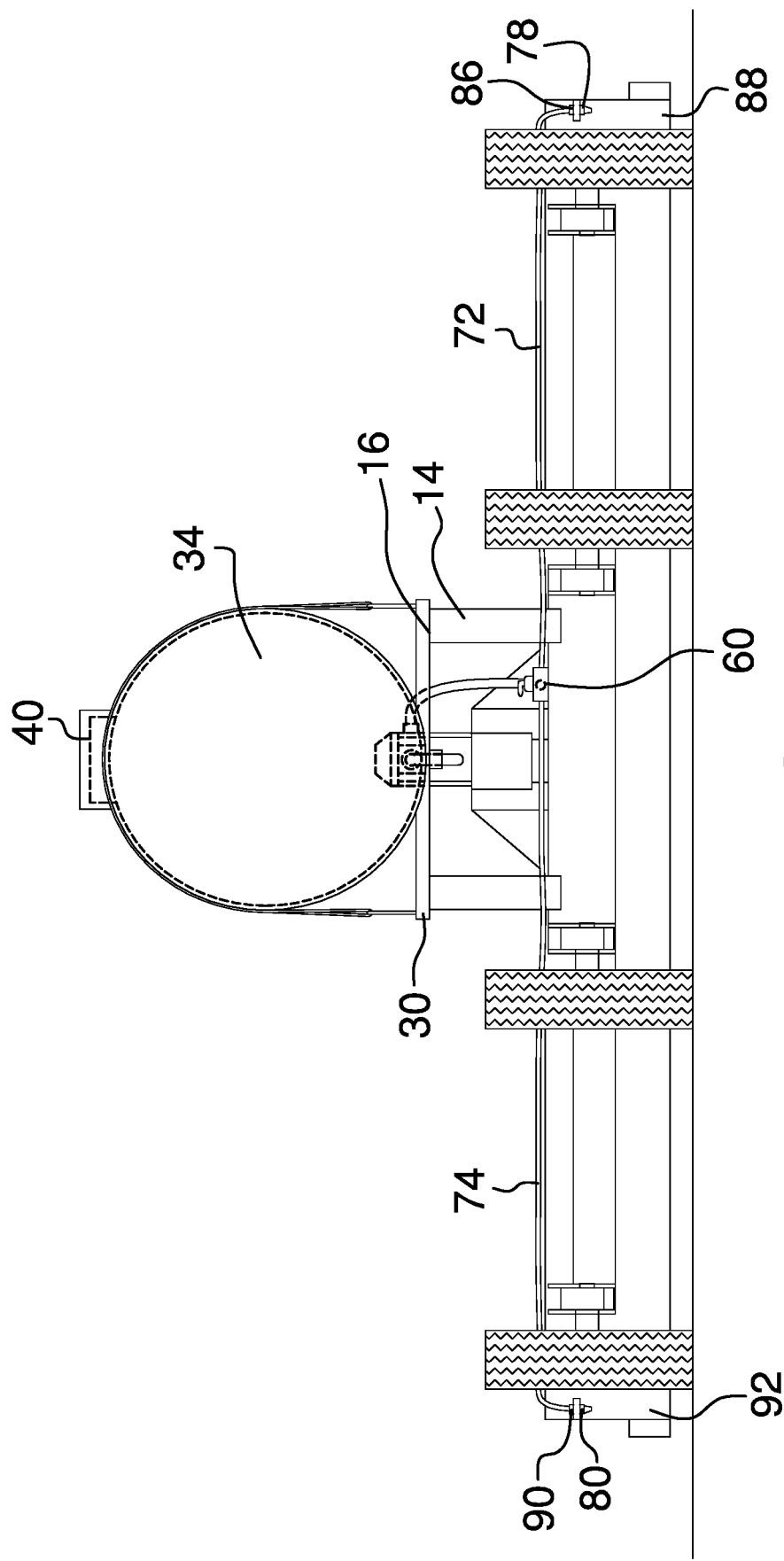
FIG. 3 is a rear elevation view of an embodiment of the disclosure.
Figure 4:
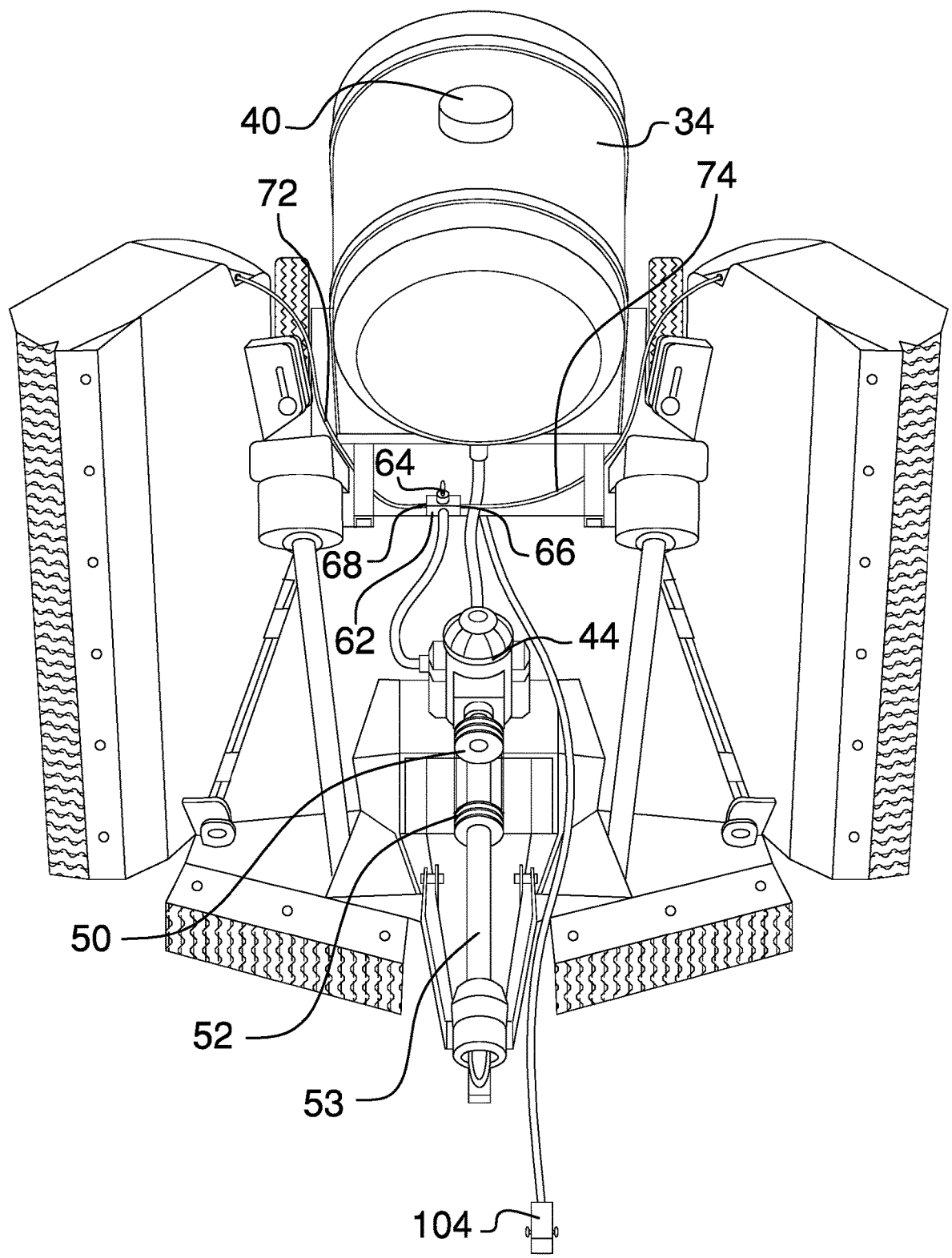
FIG. 4 is an isometric view of an embodiment of the disclosure.
Figure 5:
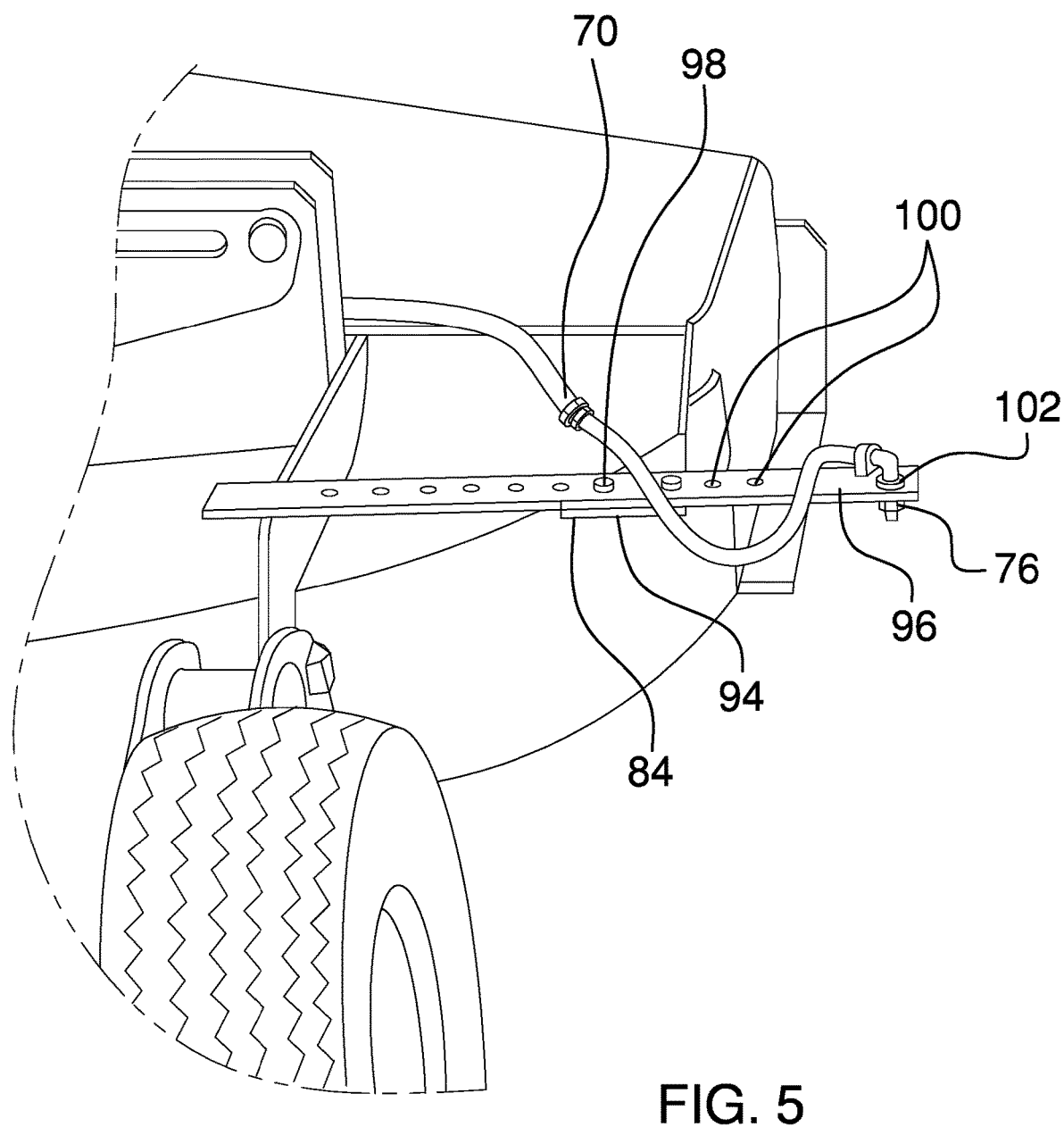
FIG. 5 is a detail view of an embodiment of the disclosure.

With reference now to the drawings, and in particular to FIGS. 1 through 5 thereof, a new sprayer attachment apparatus embodying the principles and concepts of an embodiment of the disclosure and generally designated by the reference numeral 10 will be described.

As best illustrated in FIGS. 1 through 5, the mower sprayer attachment apparatus 10 generally comprises a tank mount 12 comprising a plurality of support arms 14 and a platform 16. The plurality of support arms 14 is configured to couple to a deck 18 of a mower 20 and may comprise a pair of angled rear arms 22 and a pair of vertical front arms 24. Each of the pair of angled rear arms 22 may be angled towards a back 26 of the mower. The platform 16 may comprise a pair of runners 28 and a pair of cross bars 30 with the pair of runners 28 extending between the pair of angled rear arms 22 and the pair of vertical front arms 24. The pair of cross bars 30 comprises a rear cross bar 32 extending between the pair of angled rear arms 22 on the pair of runners 28 and a front cross bar 33 extending between the pair of vertical front arms 24 on the pair of runners 28. A storage tank 34 is coupled to the tank mount 12. The storage tank 34 has a fill aperture 36 and a release aperture 38. There may be a pair of tank straps 40 coupled to the platform 16 of the tank mount to selectively secure and alternatively release the storage tank 34. A fill cap 40 is coupled to the storage tank 34 to cover and alternatively uncover the fill aperture 36.

An intake hose 42 is coupled to the release aperture 38 of the storage tank. A pump 44 is coupled to the deck 18 of the mower and has an intake port 46, a discharge port 48, and a drive wheel 50. The intake port 46 is coupled to the intake hose 42 and the drive wheel 50 powers the pump 44 to draw a liquid from the storage tank 34 through the intake hose 42 and intake port, pressurize said liquid and expel it through the discharge port 48. The liquid may be a pesticide or an herbicide. A belt 52 is coupled to the drive wheel 50 of the pump and is configured to couple to a drive shaft 53 of the mower to rotate the drive wheel 50. The drive shaft 53 of the mower may be powered by the mower 20 itself or by a tractor towing the mower.

A spray apparatus 56 is coupled to the pump 44 and comprises a discharge hose 58 coupled to the discharge port 48 of the pump. A split valve 60 may be coupled to the discharge hose 58 and comprises a splitter 62 and a valve 64. The splitter 62 is coupled to the discharge hose 58 and the valve 64 is coupled to the splitter 62. The splitter 62 has a left output 66 and a right output 68 and the valve 64 independently controls fluid communication from the discharge hose 58 to each of the left output 66 and the right output 68. A pair of spray hoses 70 is coupled to the split valve 60. The pair of spray hoses 70 comprises a right spray hose 72 coupled to the right output 68 and a left spray hose 74 coupled to the left output 66. A pair of spray nozzles 76 is coupled to the pair of spray hoses 70, the pair of spray nozzles comprises 76 a right spray nozzle 78 coupled to the right spray hose 72 and a left spray nozzle 80 coupled to the left spray hose 74. There may be a pair of nozzle mounts 84 comprising a right nozzle mount 86 coupled to a right side 88 of the mower and a left nozzle mount 90 coupled to a left side 92 of the mower. Each of the pair of nozzle mounts 84 may comprise an extension arm 94 and an adjustment arm 96. The extension arm 94 is coupled to the mower 20 and has a pair of nubs 98 and the adjustment arm 96 has a plurality of adjustment apertures 100. The plurality of adjustment apertures 100 selectively receives the pair of nubs 98 to couple the adjustment arm 96 to the extension arm 94. A nozzle aperture 102 of each of the right nozzle mount 86 and the left nozzle mount 90 receives the right spray nozzle 78 and the left spray nozzle 80, respectively.

There may be a control apparatus 104 having a controller 106 and a control cable 108 to operate the spray apparatus 56. The control cable 108 extends from the controller 106 to the split valve 60 and is in operational communication with the split valve 60 to independently control flow to each of the right spray hose 72 and the left spray hose 74. The controller 106 may have a left control button 110 and a right control button 112. The left control button 110 controls flow to the left spray hose 74 and the right control button 112 controls flow to the right spray hose 72, respectively. An operator may thus utilize the spray apparatus 56 on the left side 92 and the right side 88 of the mower independently, having both activated, one activated and one deactivated, or both deactivated.

In use, the operator fills the storage tank 34 with the liquid through the fill aperture 36 and then closes the fill aperture with the fill cap 40. The operator then runs the mower 20 as usual and utilizes the split valve 60 or the control apparatus 104 to spray the liquid as desired while mowing, thus eliminating the need to run a secondary pass with a sprayer over a mowed area.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mower sprayer attachment apparatus comprising:
    a tank mount, the tank mount comprising a plurality of support arms and a platform, the plurality of support arms being configured to couple to a deck of a mower, the platform being coupled to the plurality of support arms, the plurality of support arms of the tank mount comprising a pair of angled rear arms and a pair of vertical front arms;
    a storage tank coupled to the tank mount, the storage tank having a fill aperture and a release aperture;
    a fill cap coupled to the storage tank, the fill cap covering and alternatively uncovering the fill aperture;
    an intake hose coupled to the storage tank, the intake hose being coupled to the release aperture;
    a pump coupled to the deck of the mower, the pump having an intake port, a discharge port, and a drive wheel, the intake port being coupled to the intake hose, the drive wheel powering the pump to draw a liquid from the storage tank through the intake hose and intake port, pressurize said liquid and expel it through the discharge port;
    a belt coupled to the pump, the belt being coupled to the drive wheel, the belt being configured to couple to a drive shaft of the mower, the drive shaft thus rotating the drive wheel; and
    a spray apparatus coupled to the pump, the spray apparatus being coupled to the discharge port and releasing the liquid on each side of the mower.

2. The mower sprayer attachment apparatus of claim 1 further comprising a pair of tank straps, each of the pair of tank straps being coupled to the platform of the tank mount and selectively securing and alternatively releasing the storage tank.

3. A mower sprayer attachment apparatus comprising:
    a tank mount, the tank mount comprising a plurality of support arms and a platform, the plurality of support arms being configured to couple to a deck of a mower, the platform being coupled to the plurality of support arms;
    a storage tank coupled to the tank mount, the storage tank having a fill aperture and a release aperture;
    a fill cap coupled to the storage tank, the fill cap covering and alternatively uncovering the fill aperture;
    an intake hose coupled to the storage tank, the intake hose being coupled to the release aperture;
    a pump coupled to the deck of the mower, the pump having an intake port, a discharge port, and a drive wheel, the intake port being coupled to the intake hose, the drive wheel powering the pump to draw a liquid from the storage tank through the intake hose and intake port, pressurize said liquid and expel it through the discharge port;

a belt coupled to the pump, the belt being coupled to the drive wheel, the belt being configured to couple to a drive shaft of the mower, the drive shaft thus rotating the drive wheel;
a spray apparatus coupled to the pump, the spray apparatus being coupled to the discharge port and releasing the liquid on each side of the mower; and
the spray apparatus comprising:
a discharge hose coupled to the pump, the discharge hose being coupled to the discharge port;
a split valve coupled to the discharge hose, the split valve comprising a splitter and a valve, the splitter being coupled to the discharge hose and the valve being coupled to the splitter, the splitter having a left output and a right output, the valve independently controlling fluid communication from the discharge hose to each of the left output and the right output;
a pair of spray hoses coupled to the split valve, the pair of spray hoses comprising a right spray hose coupled to the right output and a left spray hose coupled to the left output; and
a pair of spray nozzles coupled to the pair of spray hoses, the pair of spray nozzles comprising a right spray nozzle coupled to the right spray hose and a left spray nozzle coupled to the left spray hose, each of the right spray nozzle and the left spray nozzle being configured to couple to each of a right side and a left side of the mower, respectively.

4. The mower sprayer attachment apparatus of claim 3 further comprising a pair of nozzle mounts, the pair of nozzle mounts comprising a right nozzle mount coupled to the right side of the mower and a left nozzle mount coupled to the left side of the mower, each of the right nozzle mount and the left nozzle mount receiving the right spray nozzle and the left spray nozzle, respectively.

5. The mower sprayer attachment apparatus of claim 4 further comprising each of the pair of nozzle mounts comprising an extension arm and an adjustment arm, the extension arm being coupled to the mower and having a pair of nubs, the adjustment arm having a plurality of adjustment apertures, the plurality of adjustment apertures selectively receiving the pair of nubs to couple the adjustment arm to the extension arm, the extension arm having a nozzle aperture, the nozzle aperture of each of the right nozzle mount and the left nozzle mount receiving the right spray nozzle and the left spray nozzle, respectively.

6. The mower sprayer attachment apparatus of claim 3 further comprising a control apparatus having a controller and a control cable, the control cable extending from the controller to the split valve, the controller being in operational communication with the split valve to independently control flow to each of the right spray hose and the left spray hose.

7. The mower sprayer attachment apparatus of claim 6 further comprising the controller having a left control button and a right control button, the left control button controlling flow to the left spray hose and the right control button controlling flow to the right spray hose, respectively.

8. A mower sprayer attachment apparatus comprising:
a tank mount, the tank mount comprising a plurality of support arms and a platform, the plurality of support arms being configured to couple to a deck of a mower, the platform being coupled to the plurality of support arms, the plurality of support arms of the tank mount comprising a pair of angled rear arms;
a storage tank coupled to the tank mount, the storage tank having a fill aperture and a release aperture;
a fill cap coupled to the storage tank, the fill cap covering and alternatively uncovering the fill aperture;
an intake hose coupled to the storage tank, the intake hose being coupled to the release aperture;
a pump coupled to the deck of the mower, the pump having an intake port, a discharge port, and a drive wheel, the intake port being coupled to the intake hose, the drive wheel powering the pump to draw a liquid from the storage tank through the intake hose and intake port, pressurize said liquid and expel it through the discharge port;
a belt coupled to the pump, the belt being coupled to the drive wheel, the belt being configured to couple to a drive shaft of the mower, the drive shaft thus rotating the drive wheel; and
a spray apparatus coupled to the pump, the spray apparatus being coupled to the discharge port and releasing the liquid on each side of the mower;
a pair of tank straps, each of the pair of tank straps being coupled to the platform of the tank mount and selectively securing and alternatively releasing the storage tank; and
each of the pair of angled rear arms being angled towards a back of the mower.

9. The mower sprayer attachment apparatus of claim 8 further comprising the platform of the tank mount comprising a pair of runners and a pair of cross bars, the pair of runners extending between the pair of angled rear arms and the pair of vertical front arms, the pair of cross bars comprising a rear cross bar extending between the pair of angled rear arms on the pair of runners and a front cross bar extending between the pair of vertical front arms on the pair of runners.

10. A mower sprayer attachment apparatus comprising:
a tank mount, the tank mount comprising a plurality of support arms and a platform, the plurality of support arms being configured to couple to a deck of a mower, the plurality of support arms comprising a pair of angled rear arms and a pair of vertical front arms, each of the pair of angled rear arms being angled towards a back of the mower, the platform comprising a pair of runners and a pair of cross bars, the pair of runners extending between the pair of angled rear arms and the pair of vertical front arms, the pair of cross bars comprising a rear cross bar extending between the pair of angled rear arms on the pair of runners and a front cross bar extending between the pair of vertical front arms on the pair of runners;
a storage tank coupled to the tank mount, the storage tank having a fill aperture and a release aperture;
a pair of tank straps, each of the pair of tank straps being coupled to the platform of the tank mount and selectively securing and alternatively releasing the storage tank;
a fill cap coupled to the storage tank, the fill cap covering and alternatively uncovering the fill aperture;
an intake hose coupled to the storage tank, the intake hose being coupled to the release aperture;
a pump coupled to the deck of the mower, the pump having an intake port, a discharge port, and a drive wheel, the intake port being coupled to the intake hose, the drive wheel powering the pump to draw a liquid from the storage tank through the intake hose and intake port, pressurize said liquid and expel it through the discharge port;

a belt coupled to the pump, the belt being coupled to the drive wheel, the belt being configured to couple to a drive shaft of the mower to rotate the drive wheel;

a spray apparatus coupled to the pump, the spray apparatus comprising:

a discharge hose coupled to the pump, the discharge hose being coupled to the discharge port;

a split valve coupled to the discharge hose, the split valve comprising a splitter and a valve, the splitter being coupled to the discharge hose and the valve being coupled to the splitter, the splitter having a left output and a right output, the valve independently controlling fluid communication from the discharge hose to each of the left output and the right output;

a pair of spray hoses coupled to the split valve, the pair of spray hoses comprising a right spray hose coupled to the right output and a left spray hose coupled to the left output;

a pair of spray nozzles coupled to the pair of spray hoses, the pair of spray nozzles comprising a right spray nozzle coupled to the right spray hose and a left spray nozzle coupled to the left spray hose; and a pair of nozzle mounts, the pair of nozzle mounts comprising a right nozzle mount coupled to a right side of the mower and a left nozzle mount coupled to a left side of the mower, each of the pair of nozzle mounts comprising an extension arm and an adjustment arm, the extension arm being coupled to the mower and having a pair of nubs, the adjustment arm having a plurality of adjustment apertures, the plurality of adjustment apertures selectively receiving the pair of nubs to couple the adjustment arm to the extension arm, the extension arm having a nozzle aperture, the nozzle aperture of each of the right nozzle mount and the left nozzle mount receiving the right spray nozzle and the left spray nozzle, respectively; and a control apparatus having a controller and a control cable, the control cable extending from the controller to the split valve, the controller being in operational communication with the split valve to independently control flow to each of the right spray hose and the left spray hose, the controller having a left control button and a right control button, the left control button controlling flow to the left spray hose and the right control button controlling flow to the right spray hose, respectively.

11. A combination mower and mower sprayer attachment apparatus comprising:

a mower having a deck and a drive shaft;

a tank mount, the tank mount comprising a plurality of support arms and a platform, the plurality of support arms being couple to the deck of the mower, the plurality of support arms comprising a pair of angled rear arms and a pair of vertical front arms, each of the pair of angled rear arms being angled towards a back of the mower, the platform comprising a pair of runners and a pair of cross bars, the pair of runners extending between the pair of angled rear arms and the pair of vertical front arms, the pair of cross bars comprising a rear cross bar extending between the pair of angled rear arms on the pair of runners and a front cross bar extending between the pair of vertical front arms on the pair of runners;

a storage tank coupled to the tank mount, the storage tank having a fill aperture and a release aperture;

a pair of tank straps, each of the pair of tank straps being coupled to the platform of the tank mount and selectively securing and alternatively releasing the storage tank;

a fill cap coupled to the storage tank, the fill cap covering and alternatively uncovering the fill aperture;

an intake hose coupled to the storage tank, the intake hose being coupled to the release aperture;

a pump coupled to the deck of the mower, the pump having an intake port, a discharge port, and a drive wheel, the intake port being coupled to the intake hose, the drive wheel powering the pump to draw a liquid from the storage tank through the intake hose and intake port, pressurize said liquid and expel it through the discharge port;

a belt coupled to the pump, the belt being coupled to the drive wheel, the belt being coupled to the drive shaft of the mower to rotate the drive wheel;

a spray apparatus coupled to the pump, the spray apparatus comprising:

a discharge hose coupled to the pump, the discharge hose being coupled to the discharge port;

a split valve coupled to the discharge hose, the split valve comprising a splitter and a valve, the splitter being coupled to the discharge hose and the valve being coupled to the splitter, the splitter having a left output and a right output, the valve independently controlling fluid communication from the discharge hose to each of the left output and the right output;

a pair of spray hoses coupled to the split valve, the pair of spray hoses comprising a right spray hose coupled to the right output and a left spray hose coupled to the left output;

a pair of spray nozzles coupled to the pair of spray hoses, the pair of spray nozzles comprising a right spray nozzle coupled to the right spray hose and a left spray nozzle coupled to the left spray hose; and a pair of nozzle mounts, the pair of nozzle mounts comprising a right nozzle mount coupled to a right side of the mower and a left nozzle mount coupled to a left side of the mower, each of the pair of nozzle mounts comprising an extension arm and an adjustment arm, the extension arm being coupled to the mower and having a pair of nubs, the adjustment arm having a plurality of adjustment apertures, the plurality of adjustment apertures selectively receiving the pair of nubs to couple the adjustment arm to the extension arm, the extension arm having a nozzle aperture, the nozzle aperture of each of the right nozzle mount and the left nozzle mount receiving the right spray nozzle and the left spray nozzle, respectively; and a control apparatus having a controller and a control cable, the control cable extending from the controller to the split valve, the controller being in operational communication with the split valve to independently control flow to each of the right spray hose and the left spray hose, respectively, the controller having a left control button and a right control button, the left control button controlling flow to the left spray hose and the right control button controlling flow to the right spray hose, respectively.

* * * * *